(12) United States Patent
Thurmond et al.

(10) Patent No.: US 7,996,294 B1
(45) Date of Patent: Aug. 9, 2011

(54) SYSTEM AND METHOD FOR FINANCIAL PLANNING

(75) Inventors: Thomas Alfred Thurmond, Helotes, TX (US); Baldemar Benavidez, II, San Antonio, TX (US); Robert Anthony Pacheco, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 0 days.

(21) Appl. No.: 12/861,723

(22) Filed: Aug. 23, 2010

Related U.S. Application Data

(63) Continuation of application No. 11/388,421, filed on Mar. 24, 2006, now Pat. No. 7,809,625.

(60) Provisional application No. 60/665,338, filed on Mar. 25, 2005.

(51) Int. Cl.
*G06Q 40/00* (2006.01)

(52) U.S. Cl. ........................................ 705/36 R; 705/37
(58) Field of Classification Search ........... 705/36 R–37
See application file for complete search history.

(56) References Cited

U.S. PATENT DOCUMENTS

| | | | |
|---|---|---|---|
| 2002/0019791 A1* | 2/2002 | Goss et al. | 705/36 |
| 2002/0194115 A1* | 12/2002 | Nordlicht et al. | 705/37 |

\* cited by examiner

*Primary Examiner* — Thu Thao Havan
(74) *Attorney, Agent, or Firm* — Kilpatrick Townsend & Stockton LLP

(57) ABSTRACT

Disclosed are systems and methods for financial planning. The systems and methods communicate with a customer and provide a financial planning service for use with at least one financial planning product by collecting data from a customer using a structured data collection form which is dynamically modified based on the financial product selected, the data provided by the customer, and data relating to the customer that is retrieved from a database.

21 Claims, 24 Drawing Sheets

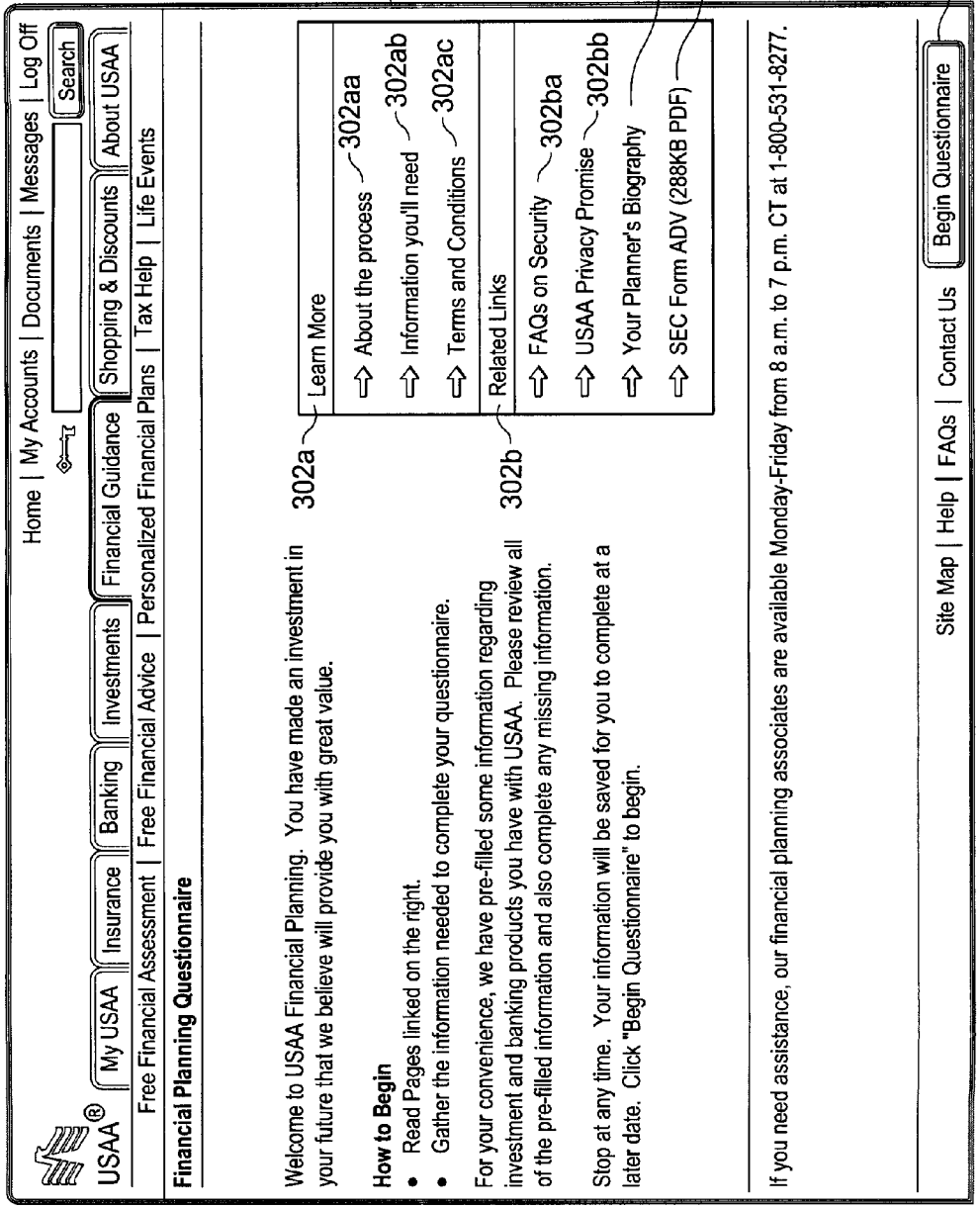

USAA® | My USAA | Insurance | Banking | Investments | Financial Guidance | Home | My Accounts | Documents | Messages | Log Off
Free Financial Assessment | Free Financial Advice | Personalized Financial Plans | Tax Help | Life Events | Search | About USAA

Financial Planning Questionnaire
Questionnaire Set Up - Military Income and Benefits

| | | |
|---|---|---|
| | Joe | |
| Pay Grade: | [E-9 ▼] | ~306a |
| | | ~306 |
| Years of Service: | [13] ~306b | |
| Do you receive Basic Allowance for Housing (BAH)? | ⊙ Yes ○ No ~306c | |
| Do you receive Basic Allowance for Subsistence? | ⊙ Yes ○ No ~306d | |
| Expected Retirement Date: | [04/04/2015] ~306e | |
| Expected Retirement Date will be used to project your Military Retirement Pay. | MM/DD/YYYY | |
| Expected Retirement Pay Grade: | [E-9 ▼] ~306f | |
| Expected Retirement Pay Grade will be used to project your Military Retirement Pay. | | |
| Military Retirement Plan: | [High-3 ▼] ~306g | |
| Career Retention Bonus (CRB) Payout Period: | [- Select - ▼] ~306h | |
| Survivor Benefit Plan (SBP) Election: | ⊙ Yes ○ No ~306i | |
| Servicemembers' Group Life Insurance (SGLI): | ⊙ Yes ○ No ~306j | |
| SGLI Amount: | $ [250,000] ~306k | |

Site Map | Help | FAQs | Contact Us    306l ~   [Previous]  [Next] ~306m

Fig. 3e

USAA® | My USAA | Insurance | Banking | Investments | Financial Guidance | Home | My Accounts | Documents | Messages | Log Off
Free Financial Assessment | Free Financial Advice | Personalized Financial Plans | Tax Help | Life Events | Search | About USAA

Financial Planning Questionnaire

Questionnaire Set Up - Military Income and Benefits

| | Jane |
|---|---|
| Pay Grade: | [E-9 ▼] — 308a |
| Years of Service: | [13] — 308b |
| Expected Retirement Date:<br>Expected Retirement Date will be used to project your Military Retirement Pay. | [04/04/2015]<br>MM/DD/YYYY — 308c |
| Expected Retirement Pay Grade:<br>Expected Retirement Pay Grade will be used to project your Military Retirement Pay. | [E-9 ▼] — 308d |
| Retirement Points Accrued: | [650] — 308e |
| Expected Total Points at Retirement: | [1968] — 308f |
| Military Retirement Plan: | [High-3 ▼] — 308g |
| Career Retention Bonus (CRB) Payout Period: | [- Select - ▼] — 308h |
| Survivor Benefit Plan (SBP) Election: | ⊙ Yes ○ No — 308i |
| Servicemembers' Group Life Insurance (SGLI): | ⊙ Yes ○ No — 308j |
| SGLI Amount: | $ [250,000] — 308k |

308l — Site Map | Help | FAQs | Contact Us    [Previous] [Next] — 308m

USAA® | My USAA | Insurance | Banking | Investments | Financial Guidance | Home | My Accounts | Documents | Messages | Log Off
Free Financial Assessment | Free Financial Advice | Personalized Financial Plans | Tax Help | Life Events | About USAA Search [ ]

Financial Planning Questionnaire

Questionnaire Set Up - Family Members
Please provide the required information for any individual that is a member of your family. If you have no family members, skip this page.

Dependent Children
Children age 18 and under on file with USAA. Uncheck the box if you cannot claim the child as a dependent for tax purposes.

| Include | First Name | Last Name | Relationship | Date of Birth |
|---|---|---|---|---|
| ☑ | Joey | Smith | Dependent Child | 04/23/1990 |
| ☑ | | Smith | Dependent Child | MM/DD/YYYY |
| ☑ | Jane | | Dependent Child | MM/DD/YYYY |

[Add]

Add Other Dependents
Include dependents and other people who you support, save for college or have designated as beneficiaries.

| First Name | Last Name | Relationship | Gender | Date of Birth |
|---|---|---|---|---|
| | | -Select- ▼ | -Select- ▼ | MM/DD/YYYY |

Site Map | Help | FAQs | Contact Us    [Previous] [Next]

Military Income and Benefits

| | Joe Smith |
|---|---|
| Pay Grade: | E5 |
| Years of Service: | 6 |
| Do you receive Basic Allowance for Housing (BAH)? | Yes |
| Do you receive Basic Allowance for Subsistence (BAS)? | Yes |
| Expected Retirement Date: | 12/31/2029 |
| Expected Retirement Pay Grade: | E-8 |
| Military Retirement Plan: | High-3 |
| Survivor Benefit Plan (SBP) Contributions: | 4% of Base Pay |
| Servicemembers' Group Life Insurance (SGLI): | Yes |
| SGLI Amount: | $250,000 |

Dependents

| Name | Relationship | Gender | Date of Birth |
|---|---|---|---|
| Joey Smith | Dependent Child | Male | 04/23/1990 |
| Mary Smith | Dependent Child | Female | 01/12/1996 |
| Dennis Rodgers | Foster Child | Male | 12/18/1994 |

Fig. 3i-2

FROM FIG. 3i-2

Investment Risk Profile

| | |
|---|---|
| What is your primary investment objective? | Growth and Income |
| Do you tend to view a decline in the value of your long-term investments as an opportunity, a failure or a temporary setback? | Temporary setback |
| How much fluctuation are you comfortable with annually? | + or - 30% |
| Which of the following statements best describes your attitude toward inflation? | Primarily concerned with protecting the value of the investments and want investments designed to minimize risk and keep pace with inflation. |
| Is the existence of a guarantee of payment of principal and/or interest highly important to you? | Yes |
| How would you rate your investment knowledge and experience? | Intermediate |
| When will you need to withdraw a lump sum from your investment resources for a planned expense? | Greater than 10 years |
| When do you expect to obtain a significant part of your income from your investments? | Greater than 10 years |

IMPORTANT: Once you click "Next," you will not be able to change any of the above information. Please verify that it is complete and accurate.

Site Map | Help | FAQs | Contact Us    [Previous]  [Next]

Fig. 3i-3

Page Name Goes Here
Page Description Goes Here

USAA® | My USAA | Insurance | Banking | Investments | Financial Guidance | Shopping & Discounts | About USAA Home | My Accounts | Documents | Messages | Log Off      Search Free Financial Assessment | Free Financial Advice | Personalized Financial Plans | Tax Help | Life Events

Financial Planning Questionnaire

Personal Assets and Liabilities

Information You Will Need

It will take you approximately 30 to 45 minutes to answer these questions concerning your personal assets and liabilities such as market values, loan balances and insurance. To customize this section you can uncheck any of the following areas that do not apply to you:

- 320a ☑ I own a home or a business.
- 320b ☐ I own rental property.
- 320c ☐ I have an Umbrella Policy.
- 320d ☑ I own vehicles.
- 320e ☑ I have liabilities such as credit cards and loans other than mortgage.

Your information is automatically saved when you click "Next" at the bottom of each page.

Site Map | Help | FAQs | Contact Us    320f — Previous   Next — 320g press <ALT + S> to toggle Specs on/off No Page Specs Found No Page Specs Found

Financial Planning Questionnaire

Savings, Investment and Retirement Accounts

Your USAA Savings, Investment and Retirement Accounts
All accounts that are checked will be included in your plan.

| Type | Account Number | Market Value or Balance | Owner/Beneficiary | Contributions / Frequency (Optional) | |
|---|---|---|---|---|---|
| ☑ FOUR STAR CHECKING | 74635322 | $2,556 | | $ | - Select - |
| ☑ USAA FIRST START SAVINGS | 18635199 | $2,556 | | $ | - Select - |
| ☑ Brokerage - Joint | 5454232178 | $18,456 | | $ | - Select - |
| ☑ Mutual Fund - Individual | | $12,326 | | $ | - Select - |
| ☑ Mutual Fund - IRA | | $2,456 | | $ | - Select - |
| ☑ UTMA | 3212356767 | $3,096 | - Select - Account Owner | $ | - Select - |
| ☑ USAA College Savings (529) | 74635263 | $12,096 | - Select - Beneficiary | $ | - Select - |
| ☑ Brokerage - SEP IRA | 74635263 | $25,764 | | $ Employee Pre-Tax | - Select - |
| | | | | $ Employer | |

USAA® | My USAA | Insurance | Banking | Investments | Home | My Accounts | Documents | Messages | Log Off
Free Financial Assessment | Free Financial Advice | Financial Guidance | Shopping & Discounts | About USAA
Personalized Financial Plans | Tax Help | Life Events

Financial Planning Questionnaire
Savings, Investment and Retirement Accounts

Provide Details for the Following Account

| | |
|---|---|
| Account Description: | Jane's 401K — 326aa |
| Type of Retirement Plan: | Roth IRA ▼ — 326ab |
| Account Owner: | Joe Smith ▼ — 326ac |
| Are any contributions made to this account? | Yes - Monthly ▼ — 326ad |
| Contribution: | $ _____ — 326ae |
| Pre-Tax Contribution: | $ 1000 — 326af |
| Post-Tax Contribution: | $ 0 — 326ag |
| Employer Contribution: | $ 150 — 326ah |

Please Enter Your Investments
Provide information about each investment you have in this account. Examples of these investments are stocks, mutual funds, bonds, cash, etc.

| Investment | Description or Ticker Symbol | Market Value |
|---|---|---|
| - Select - ▼<br>326ba | _____ 326bb<br>For stocks and mutual funds you may enter partial description and system will automatically search. For other type of holdings please provide complete description. | $ _____<br>326bc [Add] |

Site Map | Help | FAQs | Contact Us  326c — [Cancel]  [Done with this Account] — 326d USAA® | My USAA | Insurance | Banking | Investments | Financial Guidance | Home | My Accounts | Documents | Messages | Log Off Free Financial Assessment | Free Financial Advice | Personalized Financial Plans | Tax Help | Life Events

[Search] About USAA

Financial Planning Questionnaire

Cash Flow - Income

We plan to include all of your normal military income sources based on the information you gave us at the beginning of this questionnaire.

Do not include your active duty or reserve base pay, military retirement pay, BAH, or BAS.

Include any other military pay you receive based on your military occupation (flight pay or for medical doctors) or incentives such as combat pay or re-enlistment bonuses. If you currently receive military disability pay, this should also be entered here.

Enter Your Income Sources

| Description | Type of Income | Whose Income | Amount | Frequency | Begin Age | End Age | |
|---|---|---|---|---|---|---|---|
| UpJohn Pharma | Civilian Salary | Jane Smith | $65,589 | Annual | 40 | 65 | [Delete] |
| | - Select - ▼ | - Select - ▼ | | - Select - ▼ | | | [Add] |

[Go to Index] [Previous] [Save] [Next]

Site Map | Help | FAQs | Contact Us

Fig. 3p

SYSTEM AND METHOD FOR FINANCIAL PLANNING

CROSS REFERENCE TO RELATED APPLICATIONS

The present application is a continuation of and hereby claims priority under 35 U.S.C. 120 to, pending U.S. patent application Ser. No. 11/388,421, entitled "System and Method for Financial Planning," filed on Mar. 24, 2006, which in term claims priority to U.S. Provisional Application Ser. No. 60/665,338, filed on Mar. 25, 2005, the disclosure which is incorporated herein by reference.

The present application is related to co-pending application U.S. application Ser. No. 11/388,439, entitled "System and Method for Financial Planning", filed on Mar. 24, 2006, and U.S. application Ser. No. 11/388,440, entitled "System and Method for Financial Planning", filed on Mar. 24, 2006.

The entire contents of the aforementioned applications are herein expressly incorporated by reference.

FIELD OF THE DISCLOSURE

Various embodiments of the disclosure pertain to a system and method for financial planning and, more particularly, to a system and method which communicate with a customer and provide a financial planning service for use with at least one financial planning product by collecting data from a customer using a structured data collection form which is dynamically modified based on the financial product selected, the data provided by the customer, and data relating to the customer that is retrieved from a database.

BACKGROUND

Financial planning is well-known and readily appreciated by those of skill in the art. Typically, a customer chooses to begin planning for their financial future by purchasing a financial planning product from a financial planning provider. The financial planning provider then must obtain financial data relating to the financial situation of the customer. The obtaining of the customer's financial data for financial planning purposes raises a number of issues.

In order to obtain the customer's financial data for financial planning, a paper questionnaire is typically mailed out the customer. The paper questionnaire includes questions which, when answered, give the current financial situation of the customer in order to support a discussion on how to deal with the customers finances in order to achieve the customers financial goals. The paper questionnaire must include every question that might need to be asked of a customer, which results in a lengthy document which, for any given customer, will include a number of questions which are unnecessary for that particular customer. For example, a customer who is single does not need to be asked about details pertaining to a married customer. However, the paper questionnaire will typically include questions pertaining to a married customer throughout the paper questionnaire such that one questionnaire may be used for all customers. The customer enters their financial information on the questionnaire and then mails it back to the financial planning provider. The financial planning provider must then typically go over the information provided by the customer to correct mistakes and/or inconsistencies in the information provided, which can sometimes result in the need to mail the questionnaire back to the customer for correction. Once the paper questionnaire is corrected, the financial data from the questionnaire is entered into a database and a financial report is generated from that financial data. The financial report is then mailed to the customer, and the customer is contacted to discuss options for financial planning based on the financial report.

Such conventional methods of financial planning result in a time intensive process that includes a high error rate, resulting in a generally bad customer experience which can delay the financial planning for the customer.

Accordingly, it would be desirable to provide for financial planning absent the disadvantages discussed above.

SUMMARY

Various embodiments of the present disclosure are directed to systems and methods for financial planning. The systems and methods provide techniques for communicating with a customer and providing a financial planning service for use with at least one financial planning product by collecting data from a customer using a structured data collection form which is dynamically modified based on the financial product selected, the data provided by the customer, and data relating to the customer that is retrieved from a database.

BRIEF DESCRIPTION OF THE DRAWINGS

FIG. 1b is a schematic view illustrating an embodiment of an information handling system used with the system for financial planning of FIG. 1a.

FIG. 2 is a schematic view illustrating an embodiment of a provider used in the system for financial planning of FIG. 1a.

FIG. 3b is a screen shot illustrating an embodiment of the method for financial planning of FIG. 3a.

FIG. 3c is a screen shot illustrating an embodiment of the method for financial planning of FIG. 3a.

FIG. 3d is a screen shot illustrating an embodiment of the method for financial planning of FIG. 3a.

FIG. 3e is a screen shot illustrating an embodiment of the method for financial planning of FIG. 3a.

FIG. 3f is a screen shot illustrating an embodiment of the method for financial planning of FIG. 3a.

FIG. 3g is a screen shot illustrating an embodiment of the method for financial planning of FIG. 3a.

FIG. 3h is a screen shot illustrating an embodiment of the method for financial planning of FIG. 3a.

FIG. 3i is a screen shot illustrating an embodiment of the method for financial planning of FIG. 3a.

FIG. 3j is a screen shot illustrating an embodiment of the method for financial planning of FIG. 3a.

FIG. 3k is a screen shot illustrating an embodiment of the method for financial planning of FIG. 3a.

FIG. 3l is a screen shot illustrating an embodiment of the method for financial planning of FIG. 3a.

FIG. 3m is a screen shot illustrating an embodiment of the method for financial planning of FIG. 3a.

FIG. 3n is a screen shot illustrating an embodiment of the method for financial planning of FIG. 3a.

FIG. 3o is a screen shot illustrating an embodiment of the method for financial planning of FIG. 3a.

FIG. 3p is a screen shot illustrating an embodiment of the method for financial planning of FIG. 3a.

FIG. 3q is a screen shot illustrating an embodiment of the method for financial planning of FIG. 3a.

FIG. 3r is a screen shot illustrating an embodiment of the method for financial planning of FIG. 3a.

FIG. 3s is a screen shot illustrating an embodiment of the method for financial planning of FIG. 3a.

DETAILED DESCRIPTION

Figure 1A:
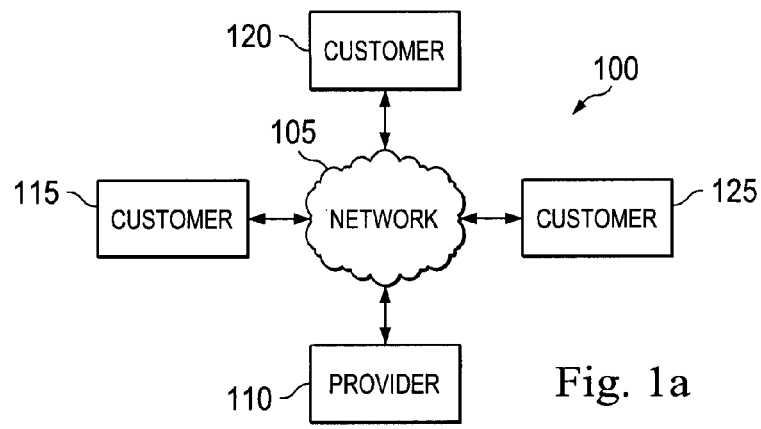
FIG. 1a is a schematic view illustrating an embodiment of a system for financial planning.

Referring now to FIG. 1a, in one embodiment, a system for financial planning 100 is illustrated. The system 100 includes a computer network 105 such as, for example, a Transport Control Protocol/Internet Protocol (TCP/IP) network (e.g., the Internet or an intranet). A provider 110 is operably coupled to the network 105. A plurality of customers 115, 120, and 125 are also operably coupled to the network 105 in order to allow communication between the customers 115, 120, and 125 and the provider 110. In an embodiment, the provider 110 includes an financial services provider. In an embodiment, the provider 110 includes a membership organization which provides a plurality of services for its members including financial planning, wherein the members include customers 115, 120 and 125. In an embodiment, the provider 110 includes anyone providing services related to financial planning.

Each of the provider 110 and the customers 115, 120, and 125 includes a respective network interface for communicating with the network 105 (e.g., outputting information to, and receiving information from, the network 105), such as by transferring information (e.g., instructions, data, signals) between such customers and the network 105. Accordingly, through the network 105, the provider 110 communicates with the customers 115, 120, and 125, and the customers 115, 120, and 125 communicate with the provider 110.

For clarity, FIG. 1a depicts only one provider 110. However, the system 100 may include a plurality of providers. Likewise, for clarity, FIG. 1a depicts only three customers 115, 120, and 125. However, the system 100 may include a plurality of customers. In the discussion below, the customer 115 is a representative one of the customers 115, 120, and 125.

Each of the provider 110 and the customers 115, 120, and 125 includes a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1a, all such IHS's are coupled to each other. Accordingly, the provider 110 and the customers 115, 120, and 125 operate within the network 105.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch and other devices coupled to a network (e.g., the network 105).

Figure 1B:
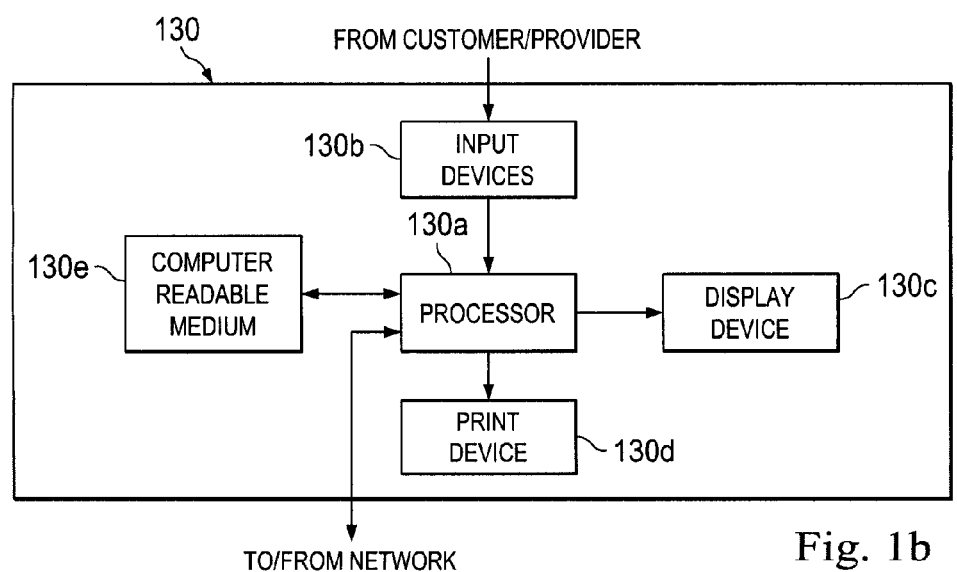

Referring now to FIG. 1b, an IHS 130 which is representative of one of the IHSs described above, is illustrated. The IHS 130 may include any or all of the following: (a) a processor 130a for executing and otherwise processing instructions, (b) a plurality of input devices 130b, which are operably coupled to the processor 130a, for inputting information, (c) a display device 130c (e.g., a conventional electronic cathode ray tub (CRT) device or a conventional liquid crystal display (LCD)), which is operably coupled to the processor 130a, for displaying information, (d) a print device 130d (e.g. a conventional electronic printer or plotter), which is operably coupled to the processor 130a, for printing visual images (e.g., textual or graphic information on paper), scanning visual images, and/or faxing visual images, (e) a computer readable medium 130e, which is operably coupled to the processor 130a, for storing information, as discussed further below, and (f) various other electronic circuitry for performing other operations of the IHS 130 known in the art.

For example, the IHS 130 includes (a) a network interface (e.g., circuitry) for communicating between the processor 130a and the network 105 and (b) a memory device (e.g., random access memory (RAM) device or read only memory (ROM) device for storing information (e.g., instructions executed by processor 130a and data operated upon by processor 130a in response to such instructions)). Accordingly the processor 130a is operably coupled to the network 105, the input devices 130b, the display device 130c, the print device 130d, and the computer readable medium 130e, as illustrated in FIG. 1b.

For example, in response to signals from the processor 130a, the display device 130c displays visual images. Information may be input to the processor 130a from the input devices 130b, and the processor 130a may receive such information from the input devices 130b. Also, in response to signals from the processor 130a, the print device 130d may print visual images on paper, scan visual images, and/or fax visual images.

The input devices include a variety of input devices known in the art such as, for example, a conventional electronic keyboard and a pointing device such as, for example, a conventional electronic "mouse", rollerball, or light pen. The keyboard may be operated to input alphanumeric text information to the processor 130a, and the processor 130a may receive such alphanumeric text information from the keyboard. The pointing device may be operated to input cursor-control information to the processor 130a, and the processor 130a may receive such cursor control information from the pointing device.

The computer readable medium 130e and the processor 130a are structurally and functionally interrelated with one another as described below in further detail. Each IHS of the illustrative embodiment is structurally and functionally interrelated with a respective computer readable medium, similar to the manner in which the processor 130a is structurally and functionally interrelated with the computer readable medium 130e. In that regard, the computer readable medium 130e is a representative one of such computer readable media including, for example, but not limited to, a hard disk drive.

The computer readable medium 130e stores (e.g., encodes, records, or embodies) functional descriptive material (e.g., including but not limited to software (also referred to as computer programs or applications) or data structures). Such functional descriptive material imparts functionality when encoded on the computer readable medium 130e. Also, such functional descriptive material is structurally and functionally interrelated to the computer readable medium 130e.

With such functional descriptive material, data structures define structural and functional interrelationships between such data structures and the computer readable medium 130e (and other aspects of the system 100). Such interrelationships permit the data structures functionality to be realized. Also, within such functional descriptive material, computer programs define structural and functional interrelationships between such computer programs and the computer readable medium 130e (and other aspects of the system 100). Such interrelationships permit the computer programs' functionality to be realized.

For example, the processor 130*a* reads (e.g., accesses or copies) such functional descriptive material from the computer readable medium 130*e* onto the memory device of the IHS 130, and the IHS 130 (more particularly, the processor 130*a*) performs its operations (as described elsewhere herein) in response to such material which is stored in the memory device of the IHS 130. More particularly, the processor 130*a* performs the operation of processing a computer application (that is stored, encoded, recorded, or embodied on a computer readable medium) for causing the processor 130*a* to perform additional operations (as described elsewhere herein). Accordingly, such functional descriptive material exhibits a functional interrelationship with the way in which processor 130*a* executes its processes and performs its operations.

Further, the computer readable medium 130*e* is an apparatus from which the computer application is accessible by the processor 130*a*, and the computer application is processable by the processor 130*a* for causing the processor 130*a* to perform such additional operations. In addition to reading such functional descriptive material from the computer readable medium 130*e*, the processor 130*a* is capable of reading such functional descriptive material from (or through) the network 105 which is also a computer readable medium (or apparatus). Moreover, the memory device of the IHS 130 is itself a computer readable medium (or apparatus).

Figure 2:
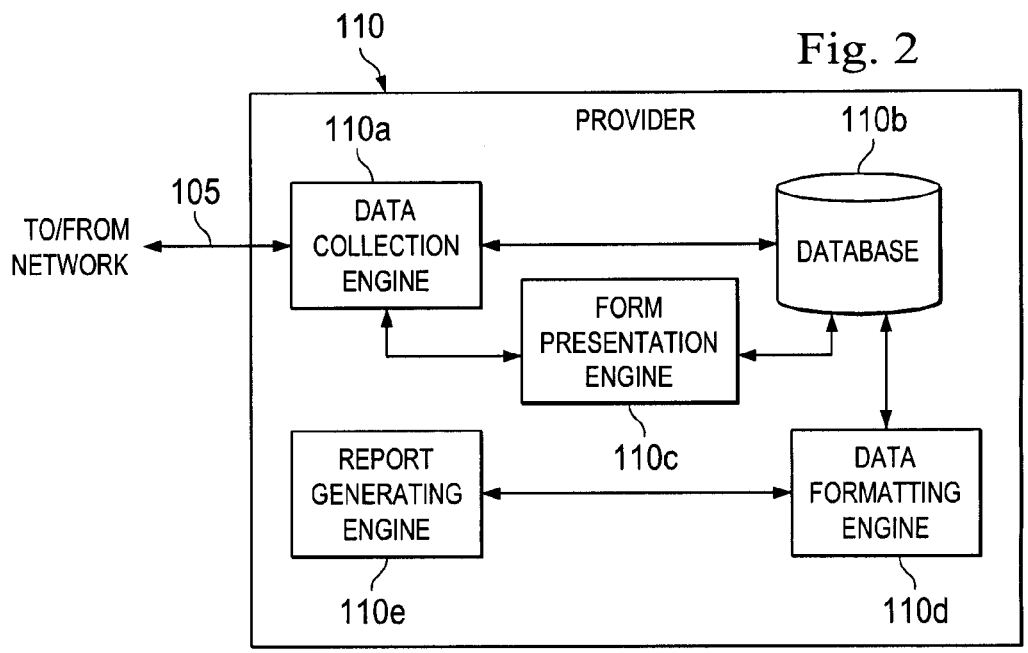

Referring now to FIGS. 1*a*, 1*b*, and 2, the provider 110 is illustrated in more detail. A data collection engine 110*a* which may be, for example, software stored on the computer-readable medium 130*e* in the IHS 130, is included in the provider 110 and is operably coupled to the network 105, described above with reference to FIG. 1*a*, and to a database 110*b*. A form presentation engine 110*c* which may be, for example, software stored on the computer-readable medium 130*e* in the IHS 130, is included in the provider 110 and is operably coupled to the data collection engine 110*a* and the database 110*b*. A data formatting engine 110*d* which may be, for example, software stored on the computer-readable medium 130*e* in the IHS 130, is included in the provider 110 and is operably coupled to the database 110*b* and to a report generating engine 110*e*. In an embodiment, the database 110*b* is a conventional database known in the art. In an embodiment, the database 110*b* may be located outside the provider 110 and still operably coupled to the provider 110, the data collection engine 110*a*, the form presentation engine 110*c*, the data formatting engine 110*d* and the report generating engine 110*e* through, for example, the network 105, described above with reference to FIG. 1*a*. In an embodiment, the database 110*b* includes a plurality of databases. In an embodiment, the provider 110 is a membership organization and the database 110*b* includes a variety of previously collected information on members of the membership organization. In an embodiment, the database 110*b* is a publicly available database. In an embodiment, the database 110*b* is a private database which is available to be accessed by the provider 110.

Referring now to FIGS. 1*a*, 1*b*, 2, and 3*a*, a method 200 for financial planning is illustrated. The method 200 begins at step 202 where the provider 110 communicates with a customer such as, for example, the customer 115, described above with reference to FIG. 1*a*. In an embodiment, the provider 110 may communicate with the customer 115 in a variety of ways such as, for example, through the network 105 using, for example, IHSs such as the IHS 130, describe above with reference to FIG. 1*b*, through phone communication, through fax communication, through face-to-face communication, and/or through a variety of other communication techniques known in the art. In an embodiment, the customer 115 is searching for a financial product in order to begin financial planning for the customers 115 financial future. In an embodiment, the customer 115 is a member of the providers 110 membership organization and is attempting to acquire financial planning services from the provider 110. In an embodiment, the communication between the provider 110 and the customer 115 include the customer 115 connecting with the provider 110 through the network 105 through, for example, a website, and being offered a plurality of different financial products provided by the provider 110.

The method 200 then proceeds to step 204 where the customer 115 selects at least one financial product. The provider 110 may offer a plurality of financial products for facilitating financial planning according to different strategies known in the art. In an embodiment, the plurality of financial products may include, for example, a comprehensive financial plan which focuses on the entire financial situation of the customer, a retirement financial plan which focuses on preparing for the customers 115 retirement, and/or a financial strategies plan which focuses on specific financial situations that the customer 115 may encounter such as, for example, planning for a child's education. In an embodiment, each of the plurality of financial products offered by the provider 110 includes a financial planning service, such that the selecting of a financial product by the customer 115 includes service by the provider 110 or another entity which compliments the financial product selected by the customer 115.

The method 200 then proceeds to step 206 where a financial planning service is activated. The form presentation engine 110*c* determines which financial product was selected by the customer 115 in step 204 of the method 200 and begins to organize a structured data collection form 300 based on the financial product chosen, as embodiment of which is illustrated in FIGS. 3*b*, 3*c*, 3*d*, 3*e*, 3*f*, 3*g*, 3*h*, 3*i*, 3*j*, 3*k*, 3*l*, 3*m*, 3*n*, 3*o*, 3*p*, 3*q*, 3*r*, and 3*s*.

Referring now to FIGS. 1*a*, 1*b*, 2, 3*a* and 3*b*, the method 200 then proceeds to step 208 where the financial data of the customer 115 is collected. In an embodiment, the financial data of the customer 115 may be collected in a variety of manners such as, for example, the customer 115 interfacing directly with the structured data collection form 300 or the customer 115 communicating with the provider 110 and the provider interfacing with the structured data collection form 300. In an embodiment, the structured data collection form 300 includes a start page 302, illustrated in FIG. 3*b*. The start page 302 includes a plurality of learn more links 302*a* such as, for example, an about the process link 302*aa*, an information you'll need link 302*ab*, and a terms and conditions link 302*ac*. The start page 302 also includes a plurality of related links 302*b* such as, for example, a FAQ's on security link 302*ba*, a privacy promise link 302*bb*, a planner's biography link 302*bc*, and an SEC form link 302*bd*. The start page 302 also includes a begin questionnaire link 302*c* which, in an embodiment, will open up a personal information collection form that is structured by the form presentation engine 110*c* according to the financial product selected by the customer 115 in step 204 of the method 200. For example, if the financial product selected is for an individual plan, the form presentation engine 110*c* will structure the personal information collection form and additional forms which are to be presented to the customer 115 such that the data collection engine 110*a* will not attempt to acquire non-individual plan data such as, for example, spouse information.

Figure 3A:
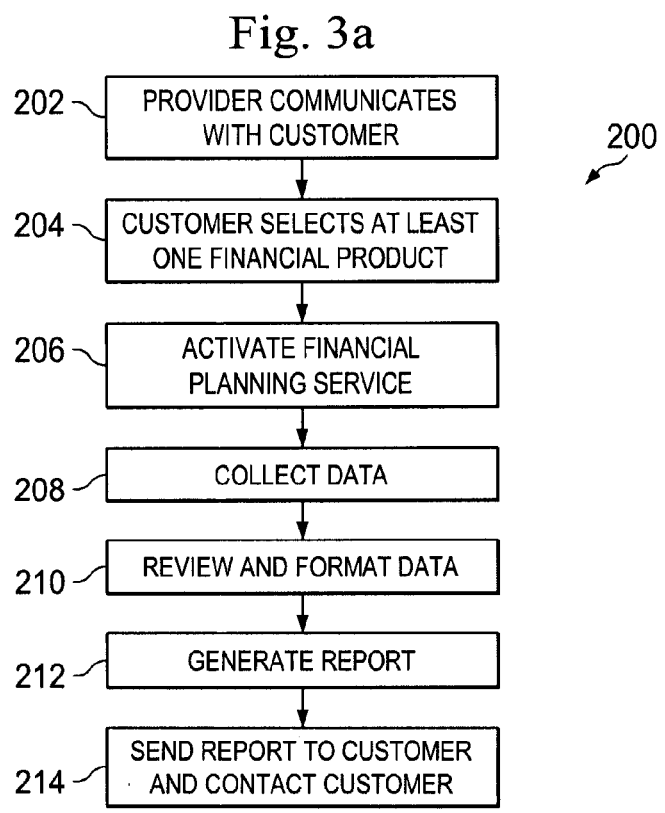
FIG. 3a is a flow chart illustrating an embodiment of a method for financial planning.
Figure 3C:

Referring now to FIG. 3*c*, in an embodiment, if the customer 115 selects the begin questionnaire link 302*c* on start page 302, a personal information collection form 304 is included as part of the structured data collection form 300. In an embodiment, the financial product selected by the customer 115 is a joint plan, and the personal information collection form 304 includes a customer field 304*a* and a spouse field 304*b*. In the event an individual financial plan is selected, the form presentation engine 110*c* would structure the personal information collection form 304 such that the spouse field 304*b* would not be included on personal information collection form 304. The customer field 304*a* includes a first name field 304*aa*, a last name field 304*ab*, a gender field 304*ac*, a city field 304*ad*, a state field 304*ae*, a zip code field 304*af*, a date of birth field 304*ag*, a tax filing status field 304*ah*, a military status field 304*ai*, and an occupation field 304*aj*. The spouse field 304*a* includes a first name field 304*ba*, a last name field 304*bb*, a gender field 304*bc*, a date of birth field 304*bd*, a tax filing status field 304*be*, a military status field 304*bf*, and an occupation field 304*bg*. In an embodiment, the data collection engine 110*a* can search the database 110*b* and acquire data about the customer 115 and/or the spouse of the customer 115 that has been previously collected such that the data is presented in the customer field 304*a* and the spouse field 304*b* so that the customer 115 does not need to enter in that data. The customer 115 may then enter the appropriate data in the fields in which the data collection engine 110*a* does not provide such data. The personal information collection form 304 also includes a previous link 304*c* which allows the customer 115 to return to the start page 302 and a next link 304*d* which allows the customer 115 to proceed to a military information collection form.

The following is an exemplary embodiment intended to illustrate how the structured data collection form 300 is dynamically structured by the form presentation engine 110*c* based on the data provided by the customer 115. The exemplary embodiment involves different data provided in the military status field 304*ai* of the personal information collection form 304. However, the structured data collection form 300 may dynamically change based on the data entered in fields other than the military status field 304*ai*, in order to provide a logical flow for providing the necessary data to provide financial planning in a convenient, structured, and efficient manner. In an embodiment, if the customer 115 enters no military status in the military status field 304*ai* of the personal information collection form 304, the form presentation engine 110*c* will ensure that no military information collection form is presented.

Referring now to FIG. 3*d*, in an embodiment, if the customer 115 enters active duty military status in the military status field 304*ai* of the personal information collection form 304, a military information collection form 306 is included by the form presentation engine 110*c* as part of the structured data collection form 300. In an embodiment, the military information collection form 306 includes a pay grade field 306*a*, a years of service field 306*b*, a yes/no basic allowance for housing field 306*c*, a yes/no basic allowance for subsistence field 306*d*, an expected retirement date field 306*e*, an expected retirement pay grade field 306*f*, a military retirement plan field 306*g*, a career retention bonus payout period field 306*h*, a yes/no survivor benefit plan election field 306*i*, a yes/no service members group life insurance field 306*j*, and an SGLI amount field 306*k*. In an embodiment, the data collection engine 110*a* can search the database 110*b* and acquire data about the customer 115 that has been previously collected such that the data is presented in the military information collection form 306 so that the customer 115 does not need to enter in that data. The customer 115 may then enter the appropriate data in the fields in which the data collection engine 110*a* did not provide such data. The military information collection form 306 also includes a previous link 306*l* which allows the customer 115 to return to the personal information collection form 304 and a next link 306*m* which allows the customer 115 to proceed to a dependents information collection form.

Referring now to FIG. 3*e*, in an embodiment, if the customer 115 enters reserve duty military status in the military status field 304*ai* of the personal information collection form 304, a military information collection form 308 is included by the form presentation engine 110*c* as part of the structured data collection form 300. In an embodiment, the military information collection form 308 includes a pay grade field 308*a*, a years of service field 308*b*, an expected retirement date field 308*c*, an expected retirement pay grade field 308*d*, a retirement points accrued field 308*e*, an expected total points at retirement field 308*f*, a military retirement plan field 308*g*, a career retention bonus payout period field 308*h*, a yes/no survivor benefit plan election field 308*i*, a yes/no service members group life insurance field 308*j*, and an SGLI amount field 308*k*. In an embodiment, the data collection engine 110*a* can search the database 110*b* and acquire data about the customer 115 that has been previously collected such that the data is presented in the military information collection form 308 so that the customer 115 does not need to enter in that data. The customer 115 may then enter the appropriate data in the field in which the data collection engine 110*a* did not provide such data. The military information collection form 308 also includes a previous link 308*l* which allows the customer 115 to return to the personal information collection form 304 and a next link 308*m* which allows the customer 115 to proceed to a dependents information collection form.

Figure 3F:

Referring now to FIG. 3*f*, in an embodiment, if the customer 115 enters retired military status in the military status field 304*ai* of the personal information collection form 304, a military information collection form 310 is included by the form presentation engine 110*c* as part of the structured data collection form 300. In an embodiment, the military information collection form 310 includes a military retirement field 310*a*, a yes/no survivor benefit plan election field 308*b*, a yes/no veterans' group life insurance field 310*c*, a VGLI amount field 310*d*, and a TRICARE plan field 310*e*. In an embodiment, the data collection engine 110*a* can search the database 110*b* and acquire data about the customer 115 that has been previously collected such that the data is presented in the military information collection form 310 so that the customer 115 does not need to enter in that data. The customer 115 may then enter the appropriate data in the fields in which the data collection engine 110*a* did not provide such data. The military information collection form 308 also includes a previous link 310*f* which allows the customer 115 to return to the personal information collection form 304 and a next link 310*g* which allows the customer 115 to proceed to a dependents information collection form. Thus, the form presentation engine 110*c* is operable to modify forms dynamically based on the data provided by the customer such that the customer 115 will only be asked to provide data relevant to the situation of that customer 115.

Referring now to FIG. 3*g*, in an embodiment, if the customer 115 selects the next link 306*m* on the military information collection form 306, the next link 308*m* on the military information collection form 308, or the next link 310*g* on the military collection form 310, a dependents information collection form 312 is included by the form presentation engine 110*c* as part of the structured data collection form 300. In an embodiment, the dependents information collection form 312 includes a dependent children section 312*a* having an include field 312*aa*; a first name field 312*ab*, a last name field 312*ac*, a relationship field 312*ad*, and a date of birth field 312*ae*. In an embodiment, the fields for providing data may be modified by the form presentation engine 110*c* from those illustrated based on data previously provided by the customer 115. In an embodiment, the data collection engine 110*a* can search the database 110*b* and acquire data about the customer 115 that has been previously collected such that the data is presented in the dependent information collection form 310 so that the customer 115 does not need to enter in that information such as, for example, the partial information for three children provided by the data collection engine 110*a* illustrated in the dependent children section 312*a* in FIG. 3*g*. The customer 115 may then provide information not found in the database 110*b* such as, for example, the information needed in the first name field 312*ab*, the last name field 312*ac*, and the date of birth field 312*ae* illustrated in FIG. 3*g*. In an embodiment, the dependents information collection form 312 also includes an add other dependents section 312*b* having a first name field 312*ba*, a last name field 312*bb*, a relationship field 312*bc*, a gender field 312*bd*, and a date of birth field 312*bc*, such that the customer 115 may add data on additional dependent children to the dependent children section 312*a*. The dependents information collection form 312 also includes a previous link 312*c* which allows the customer 115 to return to the military information collection forms described above and a next link 312*d* which allows the customer 115 to proceed to an investment risk profile form.

Figure 3H:

Referring now to FIG. 3*h*, in an embodiment, if the customer 115 selects the next link 312*d* on the dependents information collection form 312, an investment risk profile form 314 is included by the form presentation engine 110*c* as part of the structured data collection form 300. In an embodiment, the investment risk profile form 314 includes a primary investment objective field 314*a*, a loss-attitude field 314*b*, an annual fluctuation attitude field 314*c*, an inflation attitude field 314*d*, a principal/interest payment importance field 314*e*, a investment knowledge and experience field 314*f*, a lump sum withdrawal date field 314*g*, and a expected investment income use timeline field 314*h*. In an embodiment, the fields for providing data may be modified by the form presentation engine 110*c* from those illustrated based on data previously provide by the customer 115. The customer 115 may then enter the appropriate data in the fields 314*a*, 314*b*, 314*c*, 314*d*, 314*e*, 314*e*, 314*f*, 314*g*, and 314*h*. The investment risk profile form 314 also includes a previous link 314*i* which allows the customer 115 to return to the dependents information collection form 312 and a next link 314*j* which allows the customer 115 to proceed to a verification form.

Figures 1, 3I:

Referring now to FIG. 3*i*, in an embodiment, if the customer 115 selects the next link 314*j* on the investment risk profile form 314, a verification form 316 is included as part of the structured data collection form 300. The verification form 316 includes a personal information section 316*a* which includes all the personal information data either obtained from the customer 115 or retrieved from the database 110*b* by the data collection engine 110*a*. The personal information data included in the personal information section 316*a* may be selected by the customer 115 if the customer 115 wishes to change any of the personal information data. The verification form 316 also includes a military information section 316*b* which includes all the military information data either obtained from the customer 115 or retrieved from the database 110*b* by the data collection engine 110*a*. The military information data included in the military information section 316*b* may be selected by the customer 115 if the customer 115 wishes to change any of the military information data. The verification form 316 also includes a dependents information section 316*c* which includes all the dependents information data either obtained from the customer 115 or retrieved from the database 110*b* by the data collection engine 110*a*. The dependents information data included in the dependents information section 316*c* may be selected by the customer 115 if the customer 115 wishes to change any of the dependents information data. The verification form 316 also includes a investment risk profile information section 316*d* which includes all the investment risk profile information data obtained from the customer 115. The investment risk profile information data included in the investment risk profile information section 316*d* may be selected by the customer 115 if the customer 115 wishes to change any of the investment risk profile information data. The verification form 316 also includes a previous link 316*e* which allows the customer 115 to return to the investment risk profile form 314 and a next link 316*f* which allows the customer 115 to proceed to a financial planning start form. In an embodiment, if the customer 115 selects the next link 316*f*, the information included in the verification form 316 is locked such that the information may not be changed.

Figure 3J:

Referring now to FIG. 3*j*, in an embodiment, if the customer 115 selects the next link 316*f* on the verification form 314, a financial planning start form 318 is included as part of the structured data collection form 300. The financial planning start form 318 includes a financial goals link 318*a* that includes a financial goals section status 318*aa*, a personal assets and liabilities link 318*b* that includes a personal assets and liabilities section status 318*ba*, a savings, investment and retirement accounts link 318*c* that includes a savings, investment and retirement accounts section status 318*ca*, an income link 318*d* that includes an income section status 318*da*, an expenses link 318*e* that includes an expenses section status 318*ea*, an insurance and estate planning link 318*f* that includes an insurance and estate planning section status 318*fa*, and a submit questionnaire link 318*g* that includes a submit questionnaire section status 318*ga*. The financial planning start form 318 allows the customer 115 to select the different links 318*a*, 318*b*, 318*c*, 318*d*, 318*e*, 318*f*, and 318*g* in order to enter data into the different sections of the structured data collection form 300 at a time chosen by the customer 115. The status indicators 318*aa*, 318*ba*, 318*ca*, 318*da*, 318*ea*, 318*fa*, and 318*ga* indicate the status of the sections such that the customer 115 may fill out the different sections at different times in order to supply data to the provider 110 over a period of time which is convenient for the customer 115. The financial planning start form 318 also includes a save and exit link 318*h* such that the customer 115 data entered into the different section corresponding to the different links 318*a*, 318*b*, 318*c*, 318*d*, 318*e*, 318*f*, and 318*g* may be saved in order to allow the customer 115 to leave the structured data collection form 300 and come back later to add further data to the structured data collection form 300.

Referring now to FIG. 3*k*, in an embodiment, if the customer 115 selects the personal assets and liabilities link 318*b* on the financial planning start form 318, a personal assets and liabilities form 320 which is part of a personal assets and liabilities section is included by the form presentation engine 110*c* as part of the structured data collection form 300. The personal assets and liabilities form 320 includes a home/business owner field 320*a*, a rental property owner field 320*b*, an umbrella policy owner field 320*c*, a vehicle owner field 320*d*, and a credit card or non-mortgage liabilities owner field 320*d*. In an embodiment, depending on the type of product selected by the customer in step 204 of the method 200 or on other data previously provided by the customer 115, the form presentation engine 110*c* may exclude some of the fields

Figure 3L:
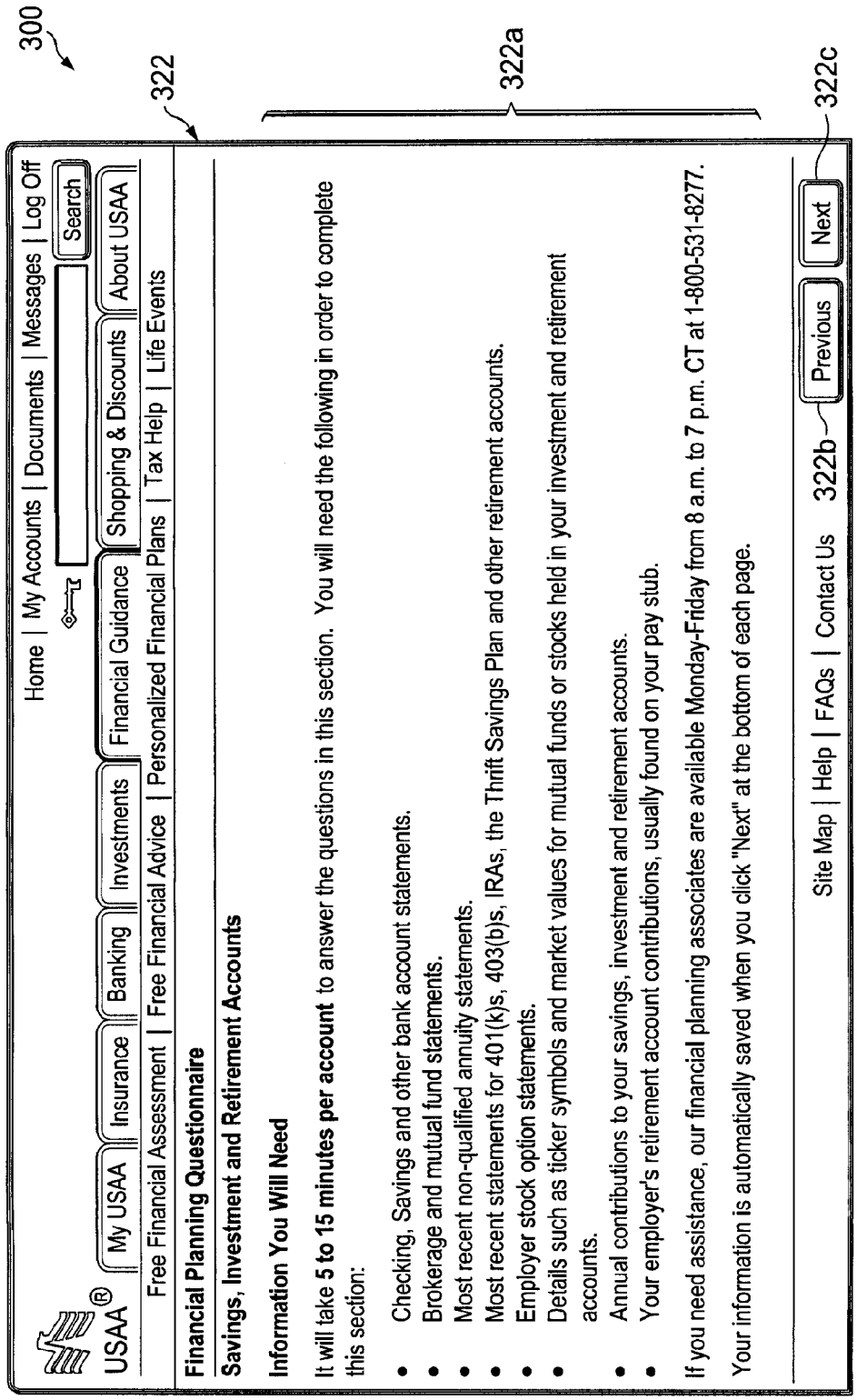

320a, 320b, 320c, 320d, or 320e and/or include additional fields not illustrated in FIG. 3l from the personal assets and liabilities form 320. Depending on the data entered in the fields 320a, 320b, 320c, 320d, or 320e, by the customer 115, further forms in the personal assets and liabilities section (which have been omitted for clarity of discussion) will be structured by the form presentation engine 110c to exclude fields requesting data that is not relevant to the situation of the customer 115. In an embodiment, the data collection engine 110a may search the database 110b and acquire data about the customer 115 that has been previously collected such that the data is presented in the personal assets and liabilities form 320 so that the customer 115 does not need to enter in that data. In an embodiment, the data collection engine 110a may acquire data such as, for example, credit card information, vehicle loan information, personal loan information, $2^{nd}$ mortgage or home equity loan information, homeowners insurance information, and/or auto insurance information. The personal assets and liabilities form 320 also includes a previous link 320f which allows the customer 115 to return to the financial planning start form 318 and a next link 320g which allows the customer 115 to proceed to further forms in the personal assets and liabilities section (which have been omitted for clarity of discussion).

Referring now to FIG. 3l, in an embodiment, if the customer 115 selects the savings, investment and retirement accounts link 318c on the financial planning start form 318, a savings, investment and retirement accounts form 322 which is part of a savings, investment and retirement accounts section is included as part of the structured data collection form 300. The savings, investment and retirement accounts form 322 includes an information you will need section 322a which includes a plurality of information the customer 115 will need in order to provide the data needed in the savings, investment and retirement accounts section such as, for example, checking, savings and other bank account statements, brokerage and mutual fund statements, annuity statements, retirement account statements, stock option statements, market value indicators investment and retirement accounts, annual contributions to savings, investment and retirement accounts, and employer contributions to retirement accounts. In an embodiment, the information you will need section 322a includes a variety of information the customer 115 will need in order to develop financial strategies for the customer 115, as will be explained in more detail below. The savings, investment and retirement accounts form 322 also includes a previous link 322b which allows the customer 115 to return to the financial planning start form 318 and a next link 322c which allows the customer 115 to proceed to further forms in the savings, investment and retirement accounts section.

Figures 2, 3M:
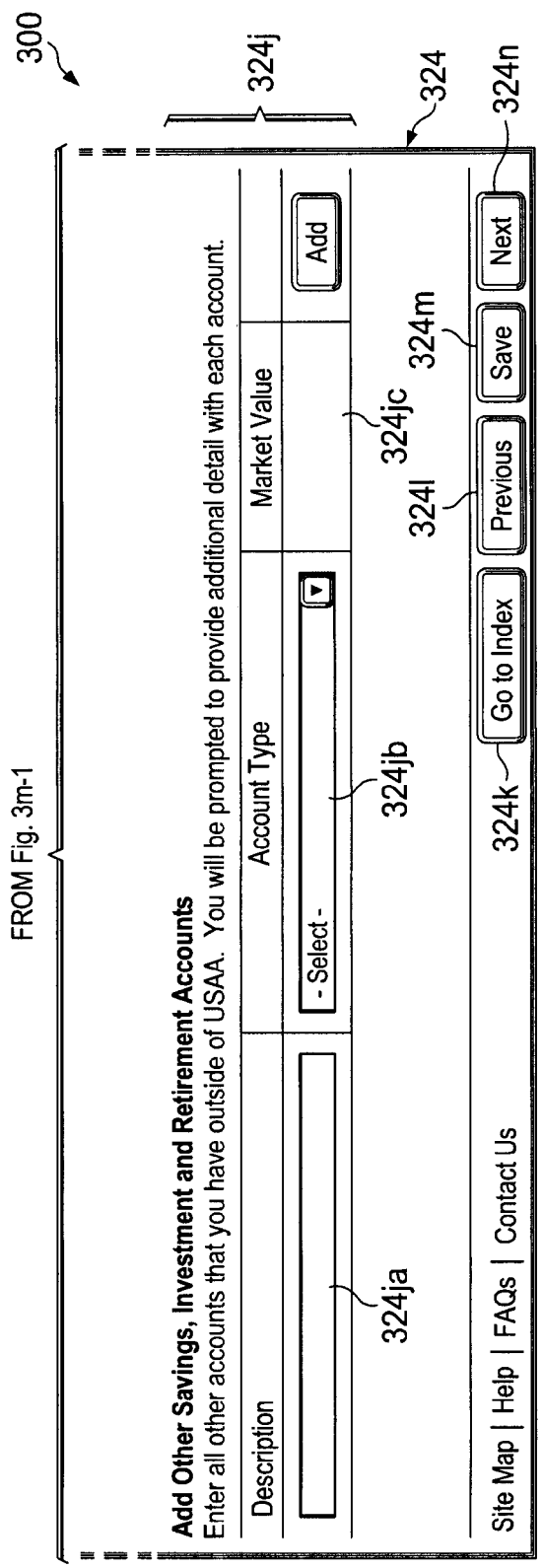

Referring now to FIG. 3m, in an embodiment, if the customer 115 selects the next link 322c on the savings, investment and retirement accounts form 322, a savings, investment and retirement accounts form 324 which is part of a savings, investment and retirement accounts section is included by the form presentation engine 110c as part of the structured data collection form 300. The savings, investment and retirement accounts form 324 includes an existing accounts section 324a having an account type field 324aa, an account number field 324ab, a market value or balance field 324ac, an owner/beneficiary field 324ad, and a contributions/frequency field 324ae. A plurality of accounts may be included in the existing accounts section 324a such as, for example, a checking account 324b, a savings account 324c, a joint brokerage account 324d, an individual mutual fund account 324e, an IRA mutual fund account 324f, a UTMA account 324g, a college savings account 324h, and an SEP IRA brokerage account 324i. Each account may be checked or unchecked by the customer 115 depending on whether the customer 115 wants that account included in their financial plan. In an embodiment, the data collection engine 110a may access the database 110b in order to pre-fill the fields 324aa, 324ab, 324ac, 324ad, 324ae of the existing accounts section 324a with data which has been previously acquired from the customer 115. For example, the data collection engine 110a may access the database 110b and, because data has been previously collected on the customer 115, the data collection engine 110a may pre-fill the account type 324aa with the college savings plan 324ha, the account number field 324ab with an account number 324hb, and the market value or balance field 324ac with a market value or balance 324hc. In an embodiment, the data collection engine 110a may access a database outside of the provider 110 in order to provide the data that is needed such as, for example, accessing the market value of a particular account from a publicly available database. When data is not available from the database 110b, the data collection engine 110a may provide an entry box for the field such as, for example, an owner/beneficiary entry box 324hd for the owner/beneficiary field 324ad and a contributions/frequency entry box 324he for the contributions/frequency field 324ae. The savings, investment and retirement accounts form 324 also includes an additional accounts section 324j having a description field 324ja, an account type field 324jb, and a market value field 324jc in which the customer 115 may include data in order to add accounts to the existing accounts section 324a. The savings, investment and retirement accounts form 324 also includes a go to index link 324k which will send the customer 115 back to the financial planning start form 318, a previous link 324l which will send the customer 115 to the savings, investment and retirement accounts form 322, a save link 324m which will save the information on the savings, investment and retirement accounts form 324, and a next link 324n which allows the customer 115 to proceed to further forms in the savings, investment and retirement accounts section.

Referring now to FIG. 3n, in an embodiment, if the customer 115 selects the next link 324n on the savings, investment and retirement accounts form 324, a savings, investment and retirement accounts form 326 which is part of a savings, investment and retirement accounts section is included by the form presentation engine 110c as part of the structured data collection form 300. The savings, investment and retirement accounts form 326 includes an account details section 326a that includes an account description field 326aa, a type of retirement plan field 326ab, an account owner field 326ac, an account contributions confirmation field 326ad, a contribution amount field 326ae, a pre-tax contribution field 326af, a post-tax contribution field 326ag, and an employer contribution field 326ah. In an embodiment, the fields for providing data may be modified by the form presentation engine 110c from those illustrated based on data previously provided by the customer 115. In an embodiment, the data collection engine 110a may access the database 110b in order to pre-fill the fields 326aa, 326ab, 326ac, 326ad, 326ae, 326af, 326ag, and 326ah of the account details section 326a with data which has been previously acquired from the customer 115. The customer 115 may then enter the appropriate data in the fields in which the data collection engine 110a did not provide such data. The savings, investment and retirement accounts form 326 also includes an investment entering section 326b that includes an investment field 326ba, a description or ticker symbol field 326bb, and a market value field 326bc that allow the customer 115 to add investments included in an account.

In an embodiment, the investment entering section 326 allows the customer 115 to enter investments such as, for example, stocks and/or mutual funds, individual bonds, cash/money market accounts, savings bonds, fixed annuities, and/or a variety of other investments known in the art. In an embodiment, the data collection engine 110a may access a database outside of the provider 110 in order to determine the market value of a particular account such as, for example, given the name of a mutual fund, the data collection engine 110a may access a database in order to determine the names and market values of stocks or other investments included in the mutual fund. The savings, investment and retirement accounts form 326 also includes a cancel link 326c which will cancel the data entered in the fields 326aa, 326ab, 326ac, 326ad, 326ae, 326af, 326ag, and 326ah, and a done with this account link 326d which saves the data entered in the fields 326aa, 326ab, 326ac, 326ad, 326ae, 326af, 326ag, and 326ah.

Figure 3O:
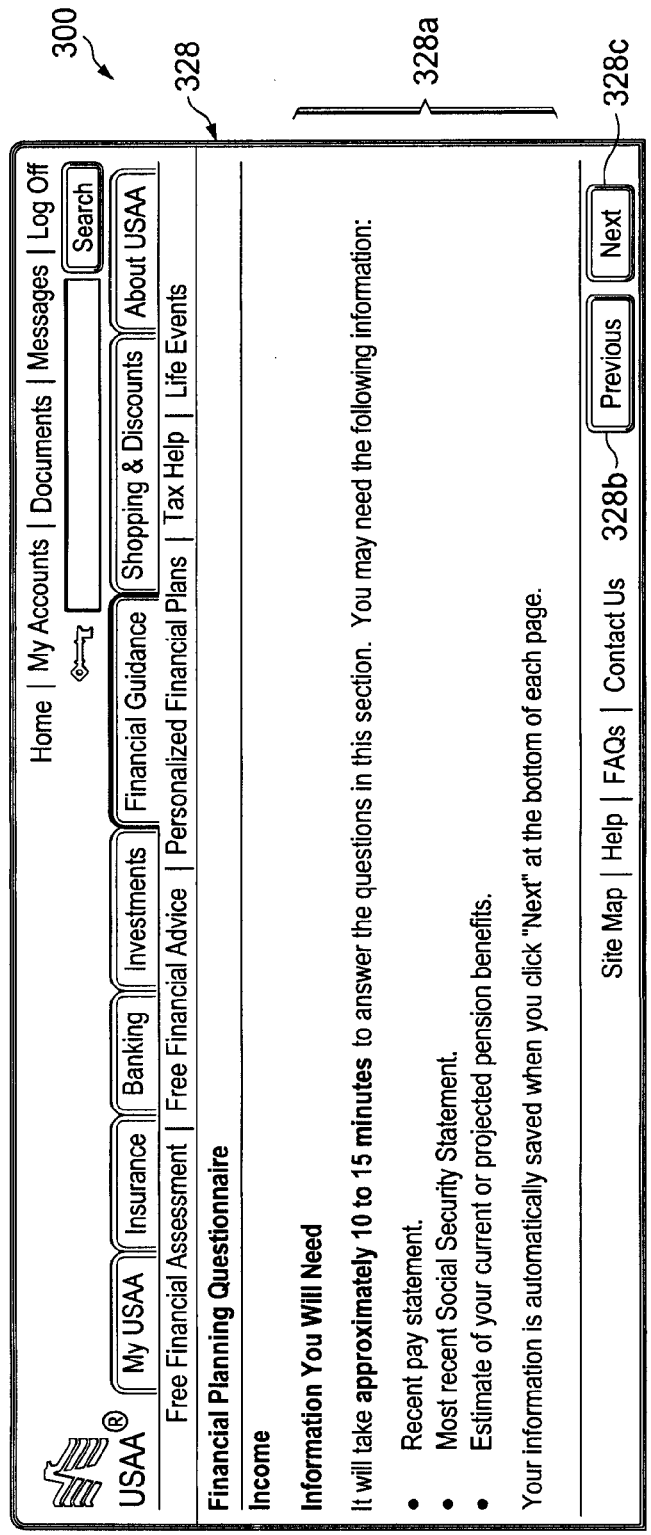

Referring now to FIG. 3o, if the customer 115 selects the income link 318d on the financial planning start form 318, an income form 328 which is part of an income section is included as part of the structured data collection form 300. The income form 328 includes an information you will need section 328a which includes a plurality of information the customer 115 will need in order to provide the data needed in the savings, investment and retirement accounts section such as, for example, recent pay statements, recent social security statements, and estimates of current and projected pension benefits. The income form 328 also includes a previous link 328b which allows the customer 115 to return to the financial planning start form 318 and a next link 328c which allows the customer 115 to proceed to further forms in the income section.

Referring now to FIG. 3p, if the customer 115 selects the next link 328c on the income form 328, an income form 330 which is part of an income section is included by the form presentation engine 110c as part of the structured data collection form 300. The income form 330 includes an income sources section 330a having a description field 330aa, a type of income field 330ab, a whose income field 330ac, an amount field 330ad, a frequency field 330ae, a begin age field 330af, and an end age field 330ag. In an embodiment, the fields for providing data may be modified by the form presentation engine 110c from those illustrated based on data previously provided the customer 115. The income sources section 330a may include an existing income source 330b with data in each of the fields 330aa, 330ab, 330ac, 330ad, 330ae, 330af, and 330ag which, in an embodiment, may be retrieved by the data collection engine 110a from the database 110b using data previously collected from the customer 115. The income sources section 330a may also include an addition income source 330c including a plurality of entry boxes to allow the customer 115 to enter data pertaining to an income source in each of the fields 330aa, 330ab, 330ac, 330ad, 330ae, 330af, and 330ag. The income form 330 also includes a go to index link 330d which will send the customer 115 back to the financial planning start form 318, a previous link 330e which will send the customer 115 to the income form 328, a save link 330f which will save the information on the income form 330, and a next link 330g which allows the customer 115 to proceed to further forms in the savings, investment and retirement accounts section (which have been omitted for clarity of discussion).

Figures 1, 3Q:
Figures 2, 3Q:
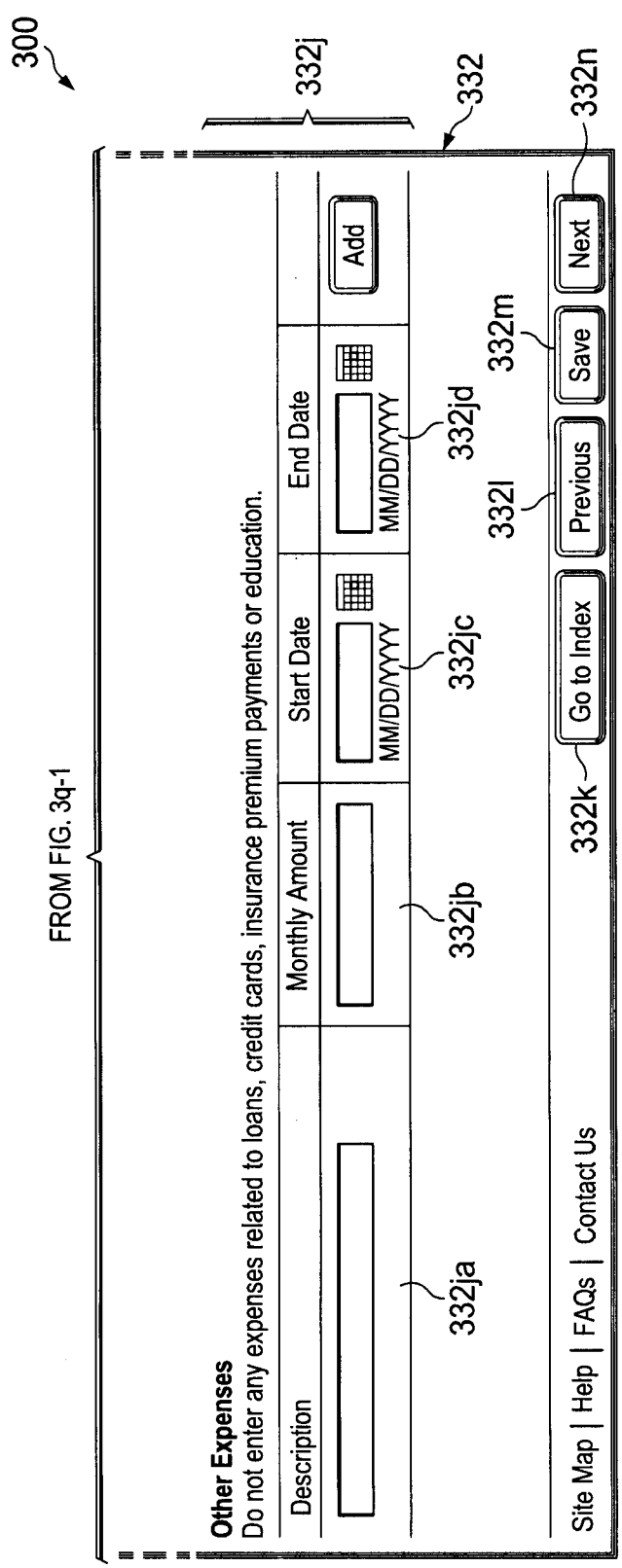

Referring now to FIG. 3q, if the customer 115 selects the expenses link 318e on the financial planning start form 318, an expenses form 332 which is part of an expenses section is included by the form presentation engine 110c as part of the structured data collection form 300. The expenses form 332 includes a rent expense field 332a, a utilities expense field 332b, a household maintenance and repairs expense field 332c, an transportation expense field 332d, a clothing expense field 332e, a groceries expense field 332f, a dining out expense field 332g, an entertainment expense field 332h, and a miscellaneous expense field 332i. In an embodiment, the fields for providing data may be modified by the form presentation engine 110c from those illustrated based on data previously provided by the customer 115. In an embodiment, the data collection engine 110a may search the database 110b and acquire data about the customer that has been previously collected such that the data is presented in the expenses form 332 so that the customer 115 does not need to enter in that data. The customer 115 may enter an amount in each of the fields 332a, 332b, 332c, 332d, 332e, 332g, 332h, and 332i in order to provide the provider 110 with expense data for financial planning. The expenses form 332 also includes an other expenses section 332j that includes a description field 332ja, a monthly amount field 332jb, a start date field 332jc, and an end date field 3332jd. The customer 115 may use the fields 332ja, 332jb, 332jc, and 332jd to enter in data related to expenses other than those provided for in the fields 332a, 332b, 332c, 332d, 332e, 332g, 332h, and 332i. The expenses form 332 also includes a go to index link 332k which will send the customer 115 back to the financial planning start form 318, a previous link 332l which will send the customer 115 back to the financial planning start form 318 or to a previous expenses form in the expenses section, a save link 332m which will save the information on the expenses form 332, and a next link 332n which allows the customer 115 to proceed to further forms in the expenses section (which have been omitted for clarity of discussion).

Figure 3R:
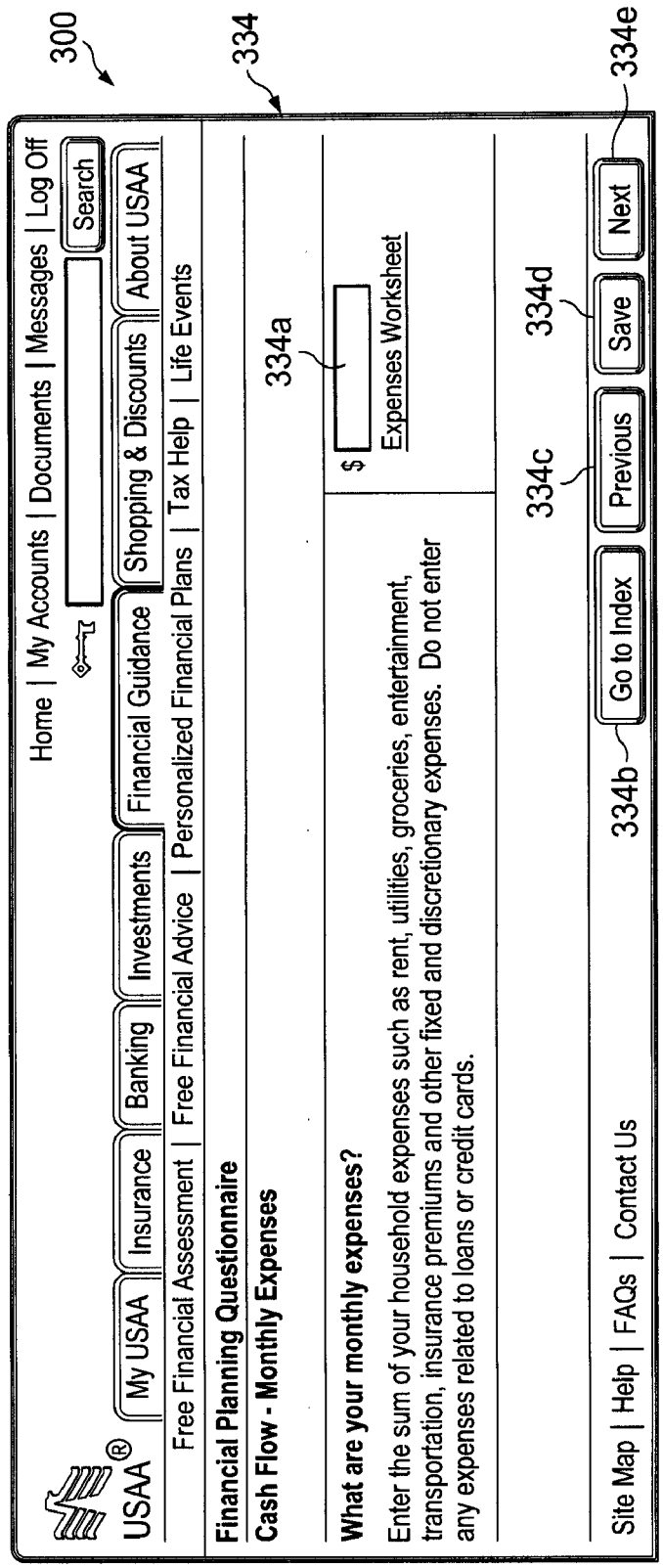

Referring now to FIG. 3r, alternatively, if the customer 115 selects the expenses link 318e on the financial planning start form 318, an expenses form 334 which is part of an expenses section is included as part of the structured data collection form 300. The expense form 334 includes a monthly expenses field 334a in which the customer 115 may enter the total of all expenses incurred by the customer 115 in a month. In an embodiment, data provided in the expense form 334 may be used for developing financial strategies for the customer 115. The expenses form 334 also includes a go to index link 334b which will send the customer 115 back to the financial planning start form 318, a previous link 334c which will send the customer 115 back to the financial planning start form 318 or to a previous expenses form in the expenses section, a save link 334d which will save the information on the expenses form 332, and a next link 334e which allows the customer 115 to proceed to further forms in the expenses section (which have been omitted for clarity of discussion).

Figure 3S:
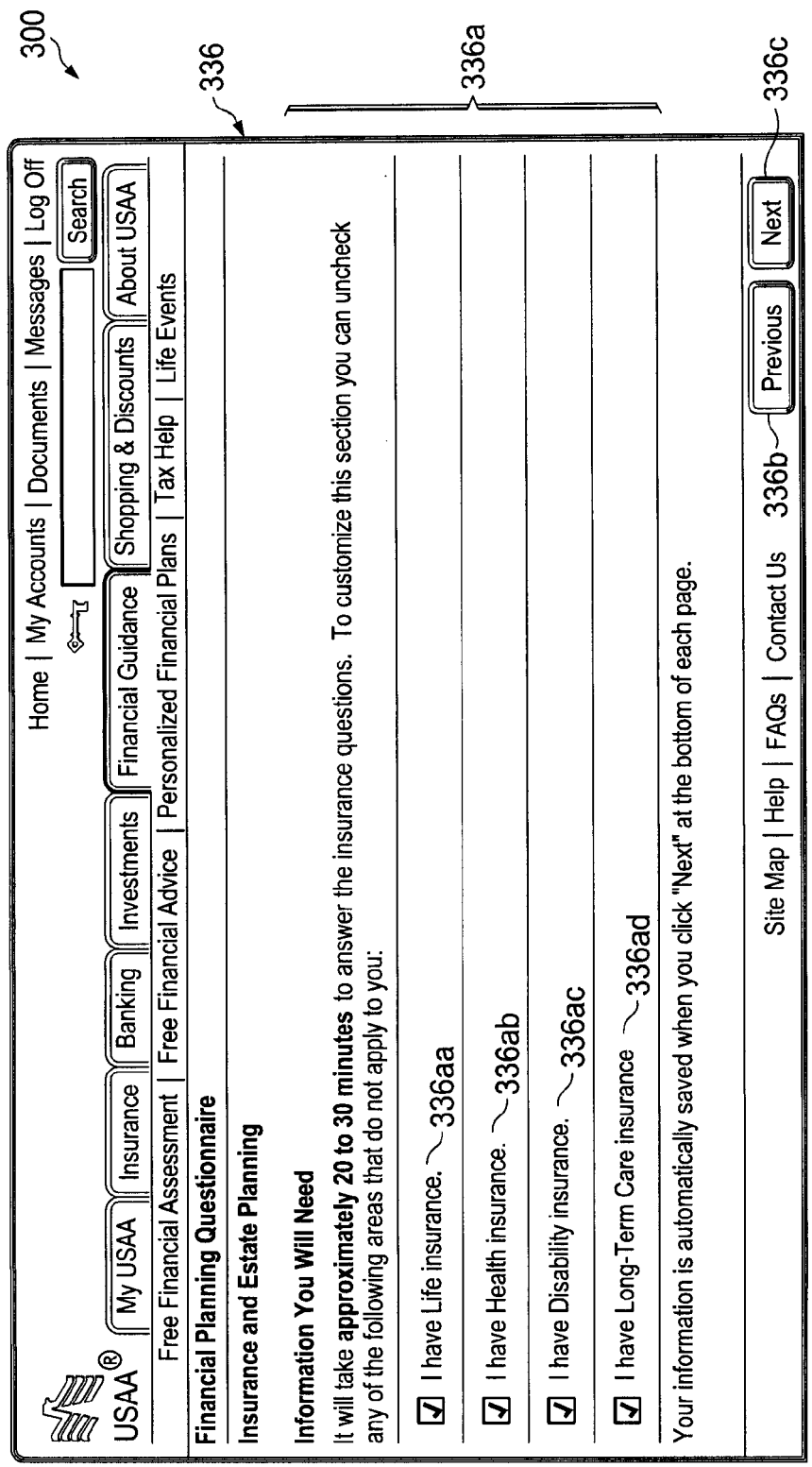

Referring now to FIG. 3s, if the customer 115 selects the insurance and estate planning link 318f on the financial planning start form 318, an insurance and estate planning form 336 which is part of an insurance and estate planning section is included by the form presentation engine 110c as part of the structured data collection form 300. The insurance and estate planning form 336 includes an information you will need section 336a that includes an I have life insurance field 336aa, an I have health insurance field 336ab, an I have disability insurance field 336ac, and an I have long-term care insurance field 336ad. In an embodiment, the data collection engine 110a may search the database 110b and acquire data about the customer that has been previously collected such that the data is presented in the insurance and estate planning form 336 so that the customer 115 does not need to enter in that data. The customer 115 may check or uncheck the different fields 336aa, 336ab, 336ac, and 336ad depending on the customer's situation, and further insurance and estate planning forms in the insurance and estate planning section may be modified by the form presentation engine 110c such that the customer 115 will only be asked to provide data pertaining to the customers 115 situation. The insurance and estate planning form 336 also includes a previous link 336b which allows the customer 115 to return to the financial planning start form 318 or to a previous insurance and estate planning form in the insurance and estate planning section and a next link 336c which allows the customer 115 to proceed to further forms in the insurance and estate planning section (which have been omitted for clarity of discussion).

Referring now to FIG. 3a, upon the collection of all the data needed by the provider 110 from the customer 115, the method 200 then proceeds to step 210 where the data is reviewed and formatted. The data formatting engine 110d may access the database 110b in order to provide data needed by the report generating engine 110e such as, for example, military pay or mutual fund composition based on the military rank or mutual fund data provided by the customer 115. The data formatting engine 110d reviews the data collected from the customer 115 in step 208 of the method 200 and ensures that the data is in a format which is usable by the report generating engine 110e. If the data in unusable by the report generating engine 110e, the customer 115 may be contacted to correct or clarify the data provided in order to put the data in a format which is usable by the report generating engine 110e. When the data is in a format which is usable by the report generating engine 110e, the method 200 then proceeds to step 212 where a report is generated. The report generating engine 110e uses the data supplied by the customer 115 to generate a financial plan based on that data such that the customer 115 may accomplish financial goals which may have been provided in step 208 of the method 200. In an embodiment, the provider 110 may include a paraplanner who reviews the report generated. The method 200 then proceeds to step 214 where the report is sent to the customer 115 and the customer 115 is contacted by the provider 110. The report generated by the report generating engine 110e may be sent to the customer 115 in a variety of manners known in the art such as, for example, by conventional mail or electronically. The customer 115 may then be contacted by a representative of the provider 110 in order to discuss the report with the customer 115. Thus, a system and method are provided which allow the collection of financial planning data for financial planning purposes using a plurality of structured forms which are dynamically modified in order to provide a logical flow for providing financial planning data in a convenient, structured, and efficient manner which greatly enhances the efficiency and accuracy in producing financial plans. In an experimental embodiment, the method 200 described above was found to reduce the time between the selecting of a financial product and the discussing of a financial plan with the provider 110 from approximately 6 weeks to 2 weeks.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system for financial planning, the system comprising at least one subsystem for:

communicating with a customer;

providing at least one financial product, wherein the customer selects the at least one financial product;

accessing a database and acquiring a first set of data collected from the customer during a previously performed financial planning service related to the at least one financial product;

collecting a second set of data from the customer for use in the financial planning service related to the at least one financial product, whereby the second set of data is collected using a structured military information collection form which is dynamically modified based on the at least one financial product selected by the customer and the first set of data relating to the customer and the second set of data collected from the customer;

generating a financial plan based on the selected financial product, the first set of data, and the second set of data; and providing the financial plan for the customer.

2. The system of claim 1, wherein the customer comprises a member of a membership organization and the database comprises a membership database comprising the first set of data which was collected prior to the communicating.

3. The system of claim 1, wherein the database comprises a publicly available database.

4. The system of claim 1, further comprising at least one subsystem for:

reviewing the first set of data relating to the customer and the second set of data collected from the customer.

5. The system of claim 1, further comprising at least one subsystem for:

generating a report from the first set of data relating to the customer and the second set of data collected from the customer.

6. The system of claim 1, further comprising at least one subsystem for:

providing the customer with a report generated from the first set of data relating to the customer and the second set of data collected from the customer.

7. The system of claim 1, further comprising at least one subsystem for:

communicating with the customer to discuss a report generated from the first set of data relating to the customer and the second set of data collected from the customer.

8. A computer-readable medium storing computer-readable instructions for financial planning, said computer-readable instructions comprising instructions for:

communicating with a customer;

providing at least one financial product, wherein the customer selects the at least one financial product;

accessing a database and acquiring a first set of data collected from the customer during a previously performed financial planning service related to the at least one financial product;

collecting a second set of data from the customer for use in the financial planning service related to the at least one financial product, whereby the second set of data is collected using a structured data collection form which is dynamically modified based on the at least one financial product selected by the customer and the first set of data relating to the customer and the second set of data collected from the customer;

generating a financial plan based on the selected financial product, the first set of data, and the second set of data; and providing the financial plan for the customer.

9. The computer-readable medium of claim 8, wherein the customer comprises a member of a membership organization and the database comprises a membership database comprising the first set of data which was collected prior to the communicating.

10. The computer-readable medium of claim 8, wherein the database comprises a publicly available database.

11. The computer-readable medium of claim 8, further comprising computer-readable instructions comprising instructions for:
reviewing the first set of data relating to the customer and the second set of data collected from the customer.

12. The computer-readable medium of claim 8, further comprising computer-readable instructions comprising instructions for:
generating a report from the first set of data relating to the customer and the second set of data collected from the customer.

13. The computer-readable medium of claim 8, further comprising computer-readable instructions comprising instructions for:
providing the customer with a report generated from the first set of data relating to the customer and the second set of data collected from the customer.

14. The computer-readable medium of claim 8, further comprising computer-readable instructions comprising instructions for:
communicating with the customer to discuss a report generated from the first set of data relating to the customer and the second set of data collected from the customer.

15. A method for financial planning, the method comprising:
communicating with a customer;
providing at least one financial product, wherein the customer selects the at least one financial product;
accessing a database and acquiring a first set of data collected from the customer during a previously performed financial planning service related to the at least one financial product;
collecting a second set of data from the customer for use in the financial planning service related to the at least one financial product, whereby the second set of data is collected using a structured data collection form which is dynamically modified based on the at least one financial product selected by the customer and the first set of data relating to the customer and the second set of data collected from the customer;
generating a financial plan based on the selected financial product, the first set of data, and the second set of data; and
providing the financial plan for the customer.

16. The method of claim 15, wherein the customer comprises a member of a membership organization and the database comprises a membership database comprising the first set of data which was collected prior to the communicating.

17. The method of claim 15, wherein the database comprises a publicly available database.

18. The method of claim 15, further comprising:
reviewing the first set of data relating to the customer and the second set of data collected from the customer.

19. The method of claim 15, further comprising:
generating a report from the, first set of data relating to the customer and the second set of data collected from the customer.

20. The method of claim 15, further comprising:
providing the customer with a report generated from the first set of data relating to the customer and the second set of data collected from the customer.

21. The method of claim 15, further comprising:
communicating with the customer to discuss a report generated from the first set of data relating to the customer and the second set of data collected from the customer.

* * * * *